H. B. HARTMAN.
APPARATUS FOR THE ELECTRICAL PURIFICATION OF WATER.
APPLICATION FILED AUG. 11, 1911.
1,101,278.
Patented June 23, 1914.
3 SHEETS—SHEET 1.
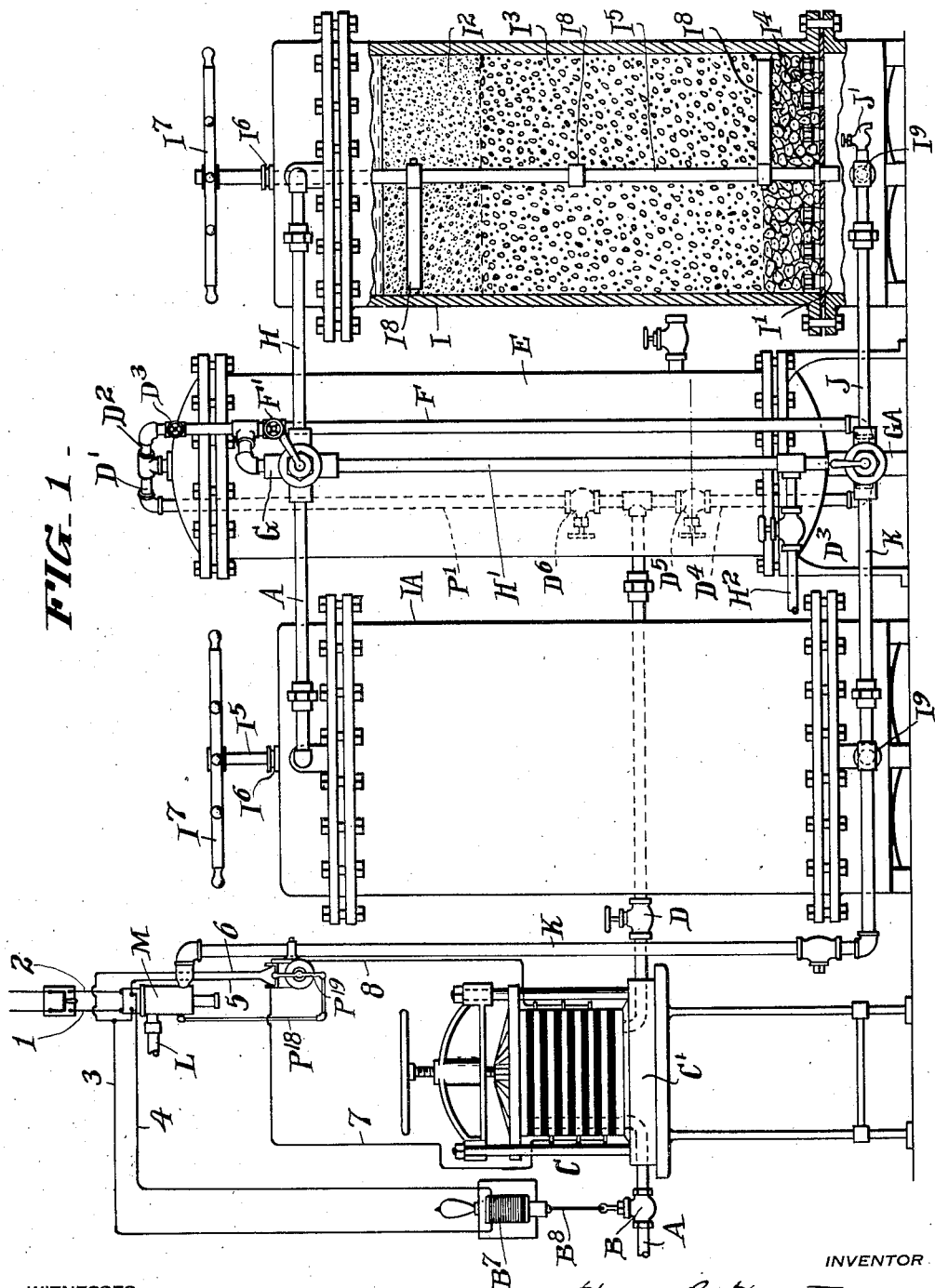

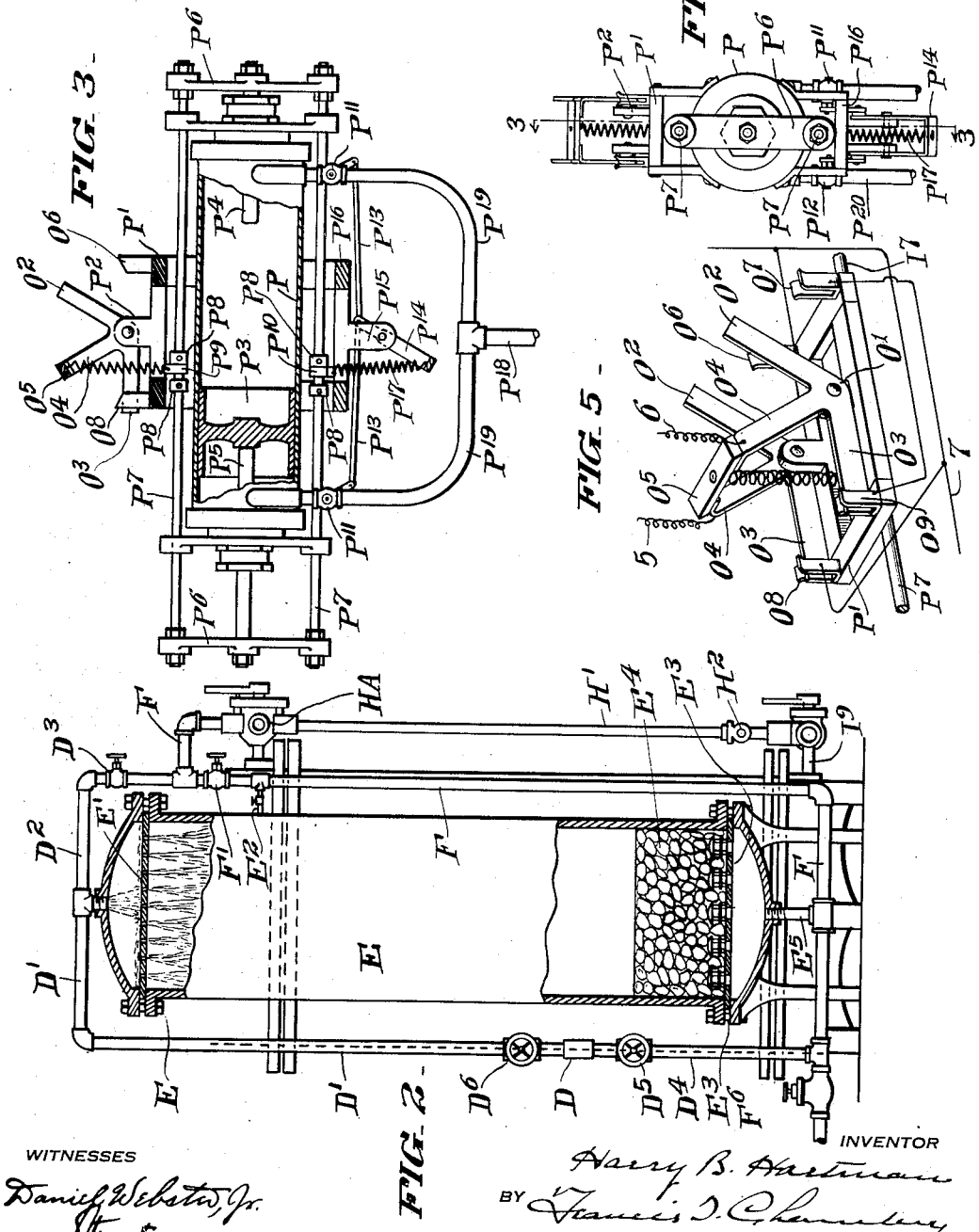

H. B. HARTMAN.
APPARATUS FOR THE ELECTRICAL PURIFICATION OF WATER.
APPLICATION FILED AUG. 11, 1911.
1,101,278.
Patented June 23, 1914.
3 SHEETS—SHEET 3.
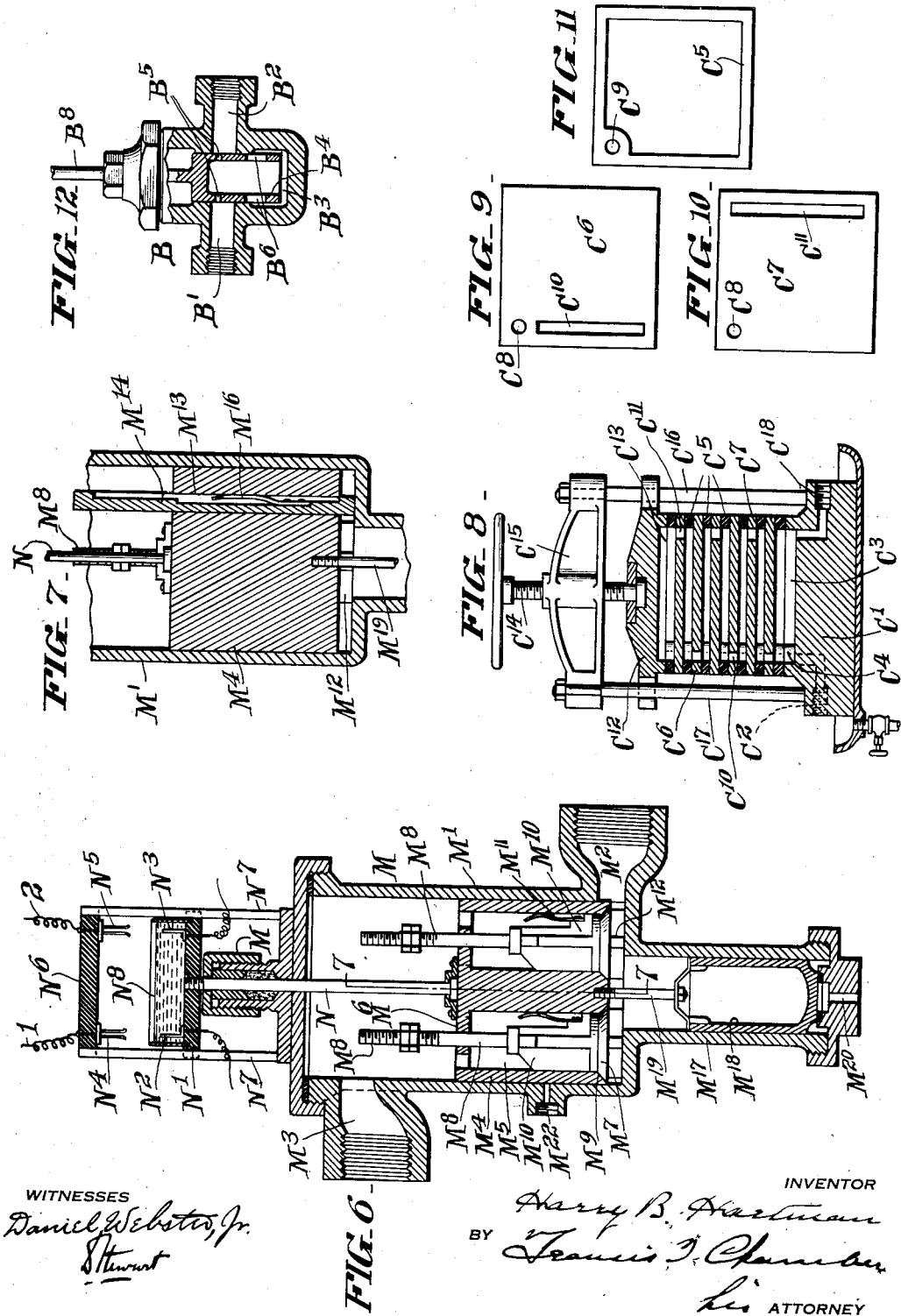

UNITED STATES PATENT OFFICE.

HARRY B. HARTMAN, OF PHILADELPHIA, PENNSYLVANIA, ASSIGNOR OF ONE-HALF TO HIMSELF AND ONE-HALF TO GEORGE A. DUNNING, OF PHILADELPHIA, PENNSYLVANIA.

APPARATUS FOR THE ELECTRICAL PURIFICATION OF WATER.

1,101,278.     Specification of Letters Patent.     Patented June 23, 1914.

Application filed August 11, 1911. Serial No. 643,473.

*To all whom it may concern:*

Be it known that I, HARRY B. HARTMAN, a citizen of the United States of America, residing in the city and county of Philadelphia and State of Pennsylvania, have invented a certain new and useful Improvement in an Apparatus for the Electrical Purification of Water, of which the following is a true and exact description, reference being had to the accompanying drawings, which form a part thereof.

My present invention consists in an improved apparatus for purifying water in accordance with the general plan heretofore known, of first subjecting the water to electrolytic action and thereafter separating out of the water precipitated or suspended impurities.

The object of the invention is to provide apparatus for purifying water in accordance with this general plan characterized by the effectiveness of the purification obtained, the economy in the cost of purification made possible and the general simplicity and compactness of the apparatus required for carrying out the invention.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred form of apparatus embodying and by means of which the invention may be carried out.

Of the drawings, Figure 1 is a diagrammatic representation, with parts broken away and in section of a water purifying plant constructed in accordance with and used in carrying out the present invention. Fig. 2 is a transverse section of the apparatus shown in Fig. 1. Fig. 3 is a section through the automatic current reversing mechanism taken on the line 3—3 of Fig. 4. Fig. 4 is an end elevation of the reversing mechanism. Fig. 5 is a perspective view of the switch mechanism proper of the current reversing mechanism. Fig. 6 is a sectional elevation of the flow controlled circuit closing mechanism. Fig. 7 is a partial section taken on the line 7—7 of Fig. 6. Fig. 8 is a section through the electrode box taken parallel to Fig. 1. Fig. 9 is a plan view of one form of electrode employed. Fig. 10 is a plan view of another form of electrode employed. Fig. 11 is a plan view of an electrode insulating gasket. Fig. 12 is a sectional elevation of the electrically operated inlet valve.

In the water purifying plant shown by the drawings A, represents the raw water supply pipe leading to the electrode box C and controlled by the electrically operated valve B. The valve B in the form shown in Fig. 12 comprises inlet and outlet passages $B'$ and $B^2$ respectively and an intermediate cylindrical valve chamber $B^3$. The valve member proper $B^4$ is shown as a tubular element snugly fitting in the chamber $B^3$ and formed with a pair of alined ports $B^5$ of small diameter which are in line with the passages $B'$ and $B^2$ when the valve is in its closed position and then permit a restricted flow through the supply pipe sufficient to make up for leakage and maintain the pressure in the purification plant proper. The valve member $B^4$ is formed also with a pair of alined ports $B^6$ of substantially larger cross section than ports $B^5$. The valve member $B^4$ is moved to bring the ports $B^6$ into register with the ports $B'$ and $B^2$ by the electro-magnet $B^7$ to the armature of which the valve member $B^4$ is connected by the rod $B^8$. The electromagnet $B^7$ is energized as hereinafter explained when water is being drawn from the plant in normal operation.

The electrode box C in the form shown in the drawings comprises a base member $C'$ formed with an inlet passage $C^2$ and at its upper end with a shallow chamber $C^3$.

$C^4$ represents a hollow boss forming a continuation of the inlet passage $C^2$ which opens at the top of the member $C'$.

Stacked up on the base member $C'$ are alternately arranged electrode plates and gaskets $C^5$ of insulating material such as vulcanized fiber. The electrode plates which are made of iron or other suitable material, are of two forms, $C^6$ and $C^7$ which are alternately arranged. The electrode plates $C^6$ and $C^7$ are alike in that each is formed with an aperture $C^8$ which registers with the upper end of the inlet passage $C^2$ and with the apertures $C^9$ formed in the gaskets $C^5$.

The electrodes $C^6$ and $C^7$ differ from each other in that each electrode $C^6$ is formed electrode plate. Above the stack of electrode while each electrode $C^7$ is formed with a slot $C^{11}$ adjacent the opposite edge of the electrode plate. Above the stock of electrodes $C^6$ and $C^7$ and interposed gaskets $C^5$ is a movable end member $C^{12}$ formed with a cavity $C^{13}$. The end member $C^{12}$ is pressed toward the end member $C'$ to compress the gaskets and make tight joints by means of a screw $C^{14}$ threaded in a crosshead $C^{15}$. The latter is pivotally connected at one end to a post $C^{16}$ secured to the base member $C'$ and formed with an eye at its opposite end adapted to be swung into engagement with a second post $C^{17}$ secured to the base member $C'$ at the opposite side of the electrodes from the post $C^{16}$.

With the electrode box construction described it will be observed that the base member $C'$, crosshead $C^{15}$, posts $C^{16}$ and $C^{17}$ form the frame work of a press of which the end member $C^{12}$ corresponds to the movable platen.

It will be apparent that the electrode box disclosed may be assembled and disassembled with great ease and celerity notwithstanding the tendency of material deposited from the water to cement the joints between the electrodes and gaskets and between the end gaskets and the end members of the apparatus. Furthermore, by employing gaskets of different thicknesses the distance between the electrode plates may be readily adjusted as is frequently desirable in treating water of different characteristics or under different conditions. It is easy also to increase or decrease the number of electrodes employed as conditions may make desirable. The passage through the electrode box shown for the water being treated is up from the inlet passage $C^2$ through the vertical channel formed by the registering apertures $C^8$ and $C^9$ in the electrodes and gaskets to the chamber $C^{13}$ and thence downward to the chamber $C^3$ in the base member $C$ through the zigzag channel formed by the spaces between the adjacent pairs of electrodes and the ports $C^{10}$ and $C^{11}$ opening to each of said spaces at its opposite ends. An outlet passage $C^{18}$ leads from the chamber $C^3$.

The electrode box construction described is of very substantial practical utility and is novel with me, but is not specifically claimed herein, as it forms the subject matter of my copending application, Serial No. 643,474, filed of even date herewith, in which I disclose and claim the electrode box construction herein disclosed, as well as certain modifications thereof.

From the outlet port $C^{18}$ of the electrode box the water passes in normal operation through the pipe D and the branch pipe $D'$ to the top of the oxidizing chamber E. The latter is provided with an apertured distribution plate $E'$ at its upper end through which the water entering the chamber E through the pipe $D'$ is separated into fine streams or spray which fall through the gas containing space of the chamber E lying between the distribution plate $E'$ and the vent connection $E^2$. The gas in the space referred to is a mixture of hydrogen and oxygen formed by the electrolytic decomposition of water in the electrode box and carried into the chamber E with the water and collecting in the upper end of the chamber. This gas has a desirable oxidizing action on the water passing through the distribution plate $E'$ and raining, so to speak, through the gas space below it. At its lower end the chamber E is provided with a filter bed supporting plate $E^3$ which may be constructed and arranged as is usual in apparatus of this general character, and supports a filter bed $E^4$ formed of coarse quartz. Below the filter bed support $E^3$ the coagulating chamber E is provided with an outlet passage $E^5$ which is connected by the pipe F to one port of the fourway valve G.

In normal operation the fourway valve G is set so that the water entering the valve through the pipe F is conveyed by the pipe H to the top of the primary filter chamber I. The filter chamber I is provided at its lower end with a filter bed supporting plate $I'$ of usual form on which is supported filter material arranged as shown in three zones or layers of which the upper layer $I^2$ is formed of fine quartz, the intermediate layer $I^3$ is formed of comparatively coarse quartz, and the bottom supporting layer $I^4$ is formed of coarse broken stone. The filter material proper comprising the layer $I^2$ and $I^3$ may be stirred up from time to time by means of stirring devices comprising a shaft $I^5$ journaled at its lower end in the filter bed support $I'$ and passing through a stuffing box $I^6$ at the upper end of the filter chamber.

$I^7$ represents a hand wheel for rotating the shaft $I^5$ and within the filter chamber the latter carries stirring arms $I^8$.

A discharge pipe $I^9$ connects the lower end of the filter chamber I to the pipe J which leads to the threeway valve GA.

$J'$ represents a drain cock connected to the pipe J.

In normal operation the three way valves GA and G are set so that the water entering the valve GA through the pipe J passes from this valve through the pipe $H'$ back to the fourway valve G and from the latter through the pipe HA, to the upper end of the secondary filter IA. The latter may be identical with the filter I, except that the materials forming the upper and intermediate filter layers of the filter IA should be finer than the material composing the filter layers $I^2$ and $I^3$ of the filter I, respectively, to which they correspond in location. The intermediate filter layer of the filter IA may well be formed of material substantially identical with that employed in the upper filter layer $I^2$ of the filter I. The discharge pipe $I^9$ of the filter IA is connected to the pipe K. The latter is connected at one end to the three way valve GA.

In the normal operation of the apparatus the valve GA is so set as to close off the end of the pipe K connected to it. The pipe K is connected at its opposite end to the service pipe L through the flow responsive circuit controlling mechanism M. The latter comprises a vertical cylinder M' with an inlet connection $M^2$ at its lower end to which the pipe K leads and an outlet connection $M^3$ at its upper end to which the service pipe L is connected. Within the cylinder M' is located a movable piston $M^4$ having a plurality of vertical passages $M^5$ extending through it from top to bottom. A spiderlike portion $M^6$ of the piston $M^4$ extends across the top of each passage $M^5$ to provide a bearing for the stem $M^8$ of a corresponding valve $M^7$ which is adapted to seat against the valve seat $M^9$ at the lower end of the passage $M^5$ and control the flow through said passage. As shown, each valve $M^7$ is provided with guide ribs $M^{10}$ which bear against the inner wall of the corresponding passage $M^5$. Springs $M^{11}$ secured one to each valve member, as by fastening it to one of the ribs $M^{10}$ cut away for the purpose, form frictional means tending to hold the valve members in any position relative to the piston $M^4$ into which they may be moved. The valves $M^7$ are formed at their lower ends with ribs $M^{12}$ which space the valves proper away from the lower end of the chamber M' and thus permit the water admitted to the cylinder M' through the port $M^2$ to act freely against the lower end of the piston $M^4$ and the valve parts connected to it. The piston $M^4$ has formed through it an equalizing passage $M^{13}$ smaller in diameter than the passage $M^5$. In this passage there is mounted a valve in the form of a rod $M^{14}$ snugly fitting but slidingly movable in the passage $M^{13}$. The rod $M^{14}$ is formed with a longitudinal slot extending from its upper end, nearly but not quite to its lower end. A spring $M^{16}$ secured to the rod $M^{14}$ tends to hold the latter in any position relative to the piston $M^{14}$ into which it may be moved. At its lower end the chamber M' is formed with an axial extension $M^{17}$ and working in this cylinder extension is a hollow cup-shaped member $M^{18}$ connected to the piston $M^4$ by a connecting rod $M^{19}$. A waste vent $M^{20}$, for leakage, extending through the lower wall of the cylinder extension, is normally closed by the piston $M^{18}$ when the piston $M^4$ is in the position shown in Fig. 6, which is the position occupied by the piston when the valves or connections through which water is discharged from the pipe L are closed, so that there is no flow out of the cylinder M' through the pipe L. In this condition of the apparatus the valves $M^7$ engage the valve seats $M^9$ and the unslotted lower end portion of the rod $M^{14}$ fills the lower end of the passage $M^{13}$ and the pressures on the two ends of the piston $M^4$ are equal. When thereafter the valves or connections through which the pipe L discharges are opened and the pressure on the upper side of the piston $M^4$ starts to fall the piston $M^4$ moves upward. The initial upward movement of the piston $M^4$ does not change the relative position of the piston $M^4$ and valve members $M^7$ and $M^{14}$, but after a slight initial movement of the piston $M^4$ the upper end of the rod $M^{14}$ and the upper ends of the valve stems $M^8$ engage the upper end wall of the cylinder M' and prevent further upward movement of the valves. The piston $M^4$ continues to move upward, however, until the passages $M^5$ and $M^{13}$ are opened to permit a flow of water through these passages sufficient to practically equalize the pressure on the opposite ends of the piston $M^4$, though it will be understood that there should be enough difference in pressure created by the throttling action of the ports to nullify the downward pull on the piston $M^4$ due to the pressure of the water against the small piston $M^{18}$ and the weight of the movable parts. When the valves or connections through which the pipe L discharges are again closed and the pressures at the opposite ends of the piston $M^4$ become equal the piston $M^4$ is quickly returned to its lowermost position by the then unbalanced action of the water on the piston $M^{18}$. The springs $M^{11}$ and $M^{16}$ hold the valve members $M^7$ and $M^{14}$ in their open position until the downward movement of the piston $M^4$ caused these valve members to engage the lower end of the cylinder M' whereupon the further downward movement of the piston $M^4$ causes these valve members to close the passages controlled by them thus returning the apparatus to the condition illustrated in Fig. 6.

The piston $M^4$ is connected to a rod M which passes through a stuffing box $M^{21}$ carried by the upper end of the cylinder M' and supports at its upper end a crosshead N'. The latter carries movable switch contacts $N^2$ and $N^3$ coöperating with the stationary switch contacts $N^4$ and $N^5$ respectively, carried by a crosshead $N^6$. The crosshead $N^6$ is supported by arms $N^7$ rising from the base of the stuffing box $M^{21}$ and serving also as guides for the crosshead N'. The latter is provided with an oil containing receptacle $N^8$ in which the contacts $N^2$ and $N^3$ are submerged so that the connection between the contacts $N^2$ and $N^3$ and $N^4$ and $N^5$ is made and broken in the oil contained in the receptacle $N^8$. The flow responsive circuit controller shown in detail in Figs. 6 and 7, while novel with me, is not claimed herein, but is claimed in my copending application, Serial No. 643,475, filed of even date herewith.

The conductors 1 and 2, supplying the electricity to the apparatus, are connected to the switch contacts $N^4$ and $N^5$ respectively, and conductors 3 and 4 run from the switch contacts $N^2$ and $N^3$ to the terminals of the electromagnet $B^7$. Other conductors 5 and 6 lead from the switch contacts $N^2$ and $N^3$ to the switch blades $O'$ and $OA'$ respectively, of the reversing switch mechanism, O. The switch blades $O'$ and $OA'$ are alike, each comprising two switch blades $O^2$ and $O^3$ inclined to each other, and an intermediate arm $O^4$ which has its upper end bent at right angles to the body of the arm. The blades $O'$ and $OA'$ are each pivotally connected to ears $P^2$ carried by an insulating base member $P'$, mounted on the cylinder member P of the actuating mechanism for the reversing switch. The bent ends of the arms $O^4$ of the two switch blade members are secured to a block of insulating material so that the two switch blades are rigidly connected and turn together about their common pivotal axis. The insulating base member $P'$ supports a pair of stationary contacts $O^6$ and $O^7$, which are engaged by the arms $O^2$, $O^2$, of the two switch blades when the switch blades are turned from the positions occupied by them in Figs. 3 and 5. The base member $P'$ also supports a pair of stationary contacts $O^8$ and $O^9$ adapted to be engaged by the arms $O^3$, $O^3$, of the switch blades $OA'$ and $O'$, respectively, when the switch blades are rocked about their pivotal axis to bring about such engagement and break the engagement between the switch blade arms $O^2$, $O^2$, and contacts $O^6$ and $O^7$. The stationary switch contacts $O^7$ and $O^8$ are both connected by the conductor 7 to one electrode or one set of electrodes of the electrode box C. Similarly the stationary contacts $O^6$ and $O^9$ are both connected by the conductor 8 to a second electrode or set of electrodes of the electrode box C. As shown in Fig. 1, the conductor 7 is separately connected to each of the electrodes $C^6$ and the conductor 8 is separately connected to each of the electrodes $C^7$, but other forms of connection between the supply conductors and the electrodes may be employed.

The mechanism for automatically rocking the switch blade conductors 7 and 8 comprises the cylinder P already referred to. In the cylinder P is a piston $P^3$ which is adapted to travel back and forth in the cylinder and to engage at the ends of its path axial rods $P^4$ and $P^5$ which are slidingly mounted in suitable stuffing boxes carried by the opposite end heads of the cylinder P. Each of the rods $P^4$ and $P^5$ is connected at its outer end to a corresponding crosshead $P^6$ and the two crossheads $P^6$ are rigidly connected together by a pair of rods $P^7$ which slide through bearings formed on the end heads. On the upper rod $P^7$, as shown in Fig. 4, are adjustably secured a pair of spaced apart collars $P^8$. Between the fixed collars $P^8$, the rod $P^7$ slidingly supports a collar $P^9$. The collar $P^9$ is connected by a spring $O^{10}$ to the connecting bar $O^5$ of the switch mechanism proper. The to and fro movement of the frame, of which the rod $P^7$ forms a part, which is produced by the movements of the piston $P^3$ causes the collar $P^9$ to be moved first into the position in which the line of action of the spring $O^{10}$ lies at one side of the pivotal axis of the switch blades $O'$ and $OA'$ and then into the position in which the line of action of this spring lies at the other side of said pivotal axis. As the line of action of the spring $O^{10}$ shifts from one side to the other of the pivotal axis of the switch blades, the tension of the spring causes the switch blades to rock from the position previously occupied by them into their other operative position, thus reversing the polarity of the conductors 7 and 8 with the desired snap action.

To produce the alternate movements of the piston $P^3$ in opposite directions an inlet valve $P^{11}$ and an outlet valve $P^{12}$ are provided at each end of the cylinder P. These valves are connected by operating rods $P^{13}$ to a rocking frame $P^{14}$ pivotally connected to ears $P^{15}$ carried by a support $P^{16}$ secured to the cylinder P. The rocking frame $P^{14}$ is connected by a spring $P^{17}$ to a sliding collar $P^{10}$ mounted on the lower rod $P^7$, as seen in Fig. 3, between the collars $P^8$ adjustably secured to that rod. In consequence, of this arrangement, it will be readily understood that the inlet valve $P^{11}$ and the outlet valve $P^{12}$ at one end of the cylinder are opened and closed respectively, and the inlet and outlet valves at the other end of the cylinder are closed and opened respectively whenever the line of action of the spring $P^{17}$ passes from one side to the other of the pivotal connection of the frame $P^{14}$. By adjusting the collars $P^8$ at the opposite ends of the valve actuating collar $P^{10}$ it is possible to regulate the extent of travel of the piston $P^3$ and thereby the quantity of water required to produce this travel necessary to shift the switch blades and valves back and forth. Water for actuating the piston $P^3$ is supplied from the port $M^{22}$ of the cylinder $M'$ through the pipe $P^{18}$ and the branches $P^{19}$ thereof, directly connected to the inlet valves $P^{11}$. Since the port $M^{22}$ is closed except when water is being drawn through the purifying apparatus it will be understood that the reversing mechanism is idle except when water is being drawn from the apparatus through the pipe L.

The reversing mechanism just described, while novel with me, is not specifically claimed herein, but forms the subject matter of my copending application, Serial No. 643,476, filed of even date herewith.

With the apparatus described, when no water is being drawn through from the service pipe L and the piston $M^4$ occupies its lowermost position, the contacts $N^2$ and $N^3$ are separated from the contacts $N^4$ and $N^5$, thus interrupting the supply of current to the electrode box and also to the electromagnet $B^7$. In consequence, the valve B is in the position in which there can take place only the restricted flow necessary to make up for leakage and to maintain the pressure in the purifying apparatus. The closure of the port $M^{22}$ consequent upon the position of the piston $M^4$ in this condition of the apparatus prevents the operation of the reversing mechanism. As soon as the pressure in the pipe L is lowered as by opening a faucet or valve connected thereto, water begins to flow through the chamber M'. The necessary pressure for producing this flow with the valve B closed is provided by the gas cushion constantly maintained in the upper end of the oxidizing chamber E above the vent pipe $E^2$. The flow of water through the chamber M' causes the piston $M^4$ to move upward as hereinbefore described thus causing the contacts $N^2$ and $N^3$ to engage the contacts $N^4$ and $N^5$ respectively. The engagement of these contacts results in supplying current to the electrodes in the electrode box C and in energizing the electromagnet $B^7$ thus opening the valve B. As the piston $M^4$ uncovers the port $M^{22}$ the reversing mechanism is set into operation. The path through which the water passes from the electrode box C to the flow responsive device M has already been described and the efficient manner in which water passing through this path is purified will be readily apparent to those skilled in the art. When, for any reason, it is desired to temporarily bypass the oxidizing chamber E, this may be accomplished by opening the valve $D^3$ in the pipe $D^2$ connecting the pipe D' to the pipe F and at the same time closing the valve F' in the pipe F.

In order to flush out the filter chamber IA, as is desirable, from time to time, I shift the three way valve GA to connect the pipes J and K and to close off the connection between the valve and the pipe H' and at the same time open the valve in the waste pipe $H^2$ connected to the pipe H'. An upward flow of partially purified water from the filter chamber I is then caused to take place through the filter chamber IA. To flush out the filter chamber I, the valve GA is set in the same position as that required to flush out the chamber IA, but the fourway valve G is shifted so that the water supplied to it through the pipe F passes through the pipe HA directly to the upper end of the filter chamber IA while the water then passed upward through the filter chamber I escapes to waste through the pipe H, fourway valve G and pipe H'. In either case it will be observed that the water which has been purified by passing it through one filter chamber is employed to flush out the other.

An upward flow of water through the oxidizing chamber E may be obtained when desired by closing the valve $D^6$ in the pipe D' and opening the valve $D^5$ in the branch pipe $D^4$, and at the same time closing the valve F' in the pipe F and opening the vlave $D^3$ in the bypass connection $D^2$. The water then issuing from the top of the chamber E may be diverted by the fourway valve G either into the pipe H' and thence to waste or through pipe $H^2$ or into the pipe H or HA and thence into the upper end of one or the other of the filter chambers I and IA as desired. The ability to occasionally pass water upward through the oxidizing chamber E and discharge it into the upper end of either filter chamber is a matter of considerable practical importance. Those familiar with the operation of water purification plants and particularly with plants in which the water is acted upon electrolytically before filtration, are aware of the fact that the efficiency of filtration depends very largely upon the deposit of coagulum on the filter material. The flushing out of either filter chamber I or IA results in removing to a large extent the coagulum previously accumulated therein, and after such a cleansing operation several hours' operation of the plant in the normal way would be required to provide a coagulum deposit in the filter chamber sufficient to fully restore the filter chamber efficiency. With the present arrangement, however, either filter chamber can be quickly resupplied with the proper amount of coagulum for efficient operation after each cleansing operation by maintaining for a short period an upward flow of water through the oxidizing chamber E and its discharge into the filter chamber to be replenished with coagulum. This is due to the fact that the coagulum collects to a considerable extent on the coarse filter material provided in the oxidizing chamber E and when water is caused to flow upward through the chamber E and thence into either filter chamber there is a rapid transfer to the latter of the coagulum previously accumulated in the oxidizing chamber E. Those skilled in the art will understand that on account of the more open character of the filter in the chamber E the latter needs to be flushed out much less frequently than do the filter chambers I and IA.

While in accordance with the provisions of the statutes, I have illustrated and described the best form of my invention now known to me, it will be apparent to those skilled in the art that changes may be made in the form of the apparatus disclosed and may be used without departing from the spirit of my invention, and that under some conditions it may be of advantage to use certain features of the invention without a corresponding use of other features.

Having now described my invention what I claim as new and desire to secure by Letters Patent, is:

1. Apparatus for the purification of water comprising in combination an electrode box, a closed oxidizing chamber, a conduit leading from said electrode box and opening to said chamber at one level, a main discharge connection opening from said chamber at a lower level and a restricted gas discharge connection opening from said chamber at a level between the first mentioned levels.

2. Apparatus for the purification of water comprising in combination an electrode box, a closed oxidizing chamber, a conduit leading from said electrode box to the upper end of said chamber, a main discharge conduit opening from the lower end of said chamber and extending upward, and a restricted gas discharge connection between said chamber and said uprising conduit opening from said chamber between the upper and lower ends of said chamber.

3. In apparatus for the electrolytic purification of water the combination of an electrode chamber, electrodes contained therein, a discharge connection leading away from said electrode chamber and comprising a gas pocket, means for supplying current to said electrodes including a circuit closing device actuated by the flow of water away from said gas pocket, a valve regulating the flow of water toward said gas pocket and means adapted to open said valve on the actuation of said circuit closing device.

4. In apparatus for the electrolytic purification of water the combination of an electrode chamber, electrodes contained in said chamber, a discharge connection leading away from said electrode chamber and including a gas pocket, means responsive to the flow of water away from said gas pocket for supplying electric current to said electrodes upon such flow, a valve regulating the flow of water through the electrode chamber toward said gas pocket and electromagnetic operating means for said valve actuated to hold the valve open when current is being supplied to said electrodes.

HARRY B. HARTMAN.

Witnesses:
 ARNOLD KATZ,
 D. STEWART.